(12) United States Patent
Mühlfeit et al.

(10) Patent No.: US 10,792,909 B2
(45) Date of Patent: Oct. 6, 2020

(54) LASER-ENGRAVABLE PAD PRINTING PLATE

(71) Applicant: Flint Group Germany GmbH, Stuttgart (DE)

(72) Inventors: Markus Mühlfeit, Weil der Stadt (DE); Alfred Leinenbach, Oberkirch-Nußbach (DE); Jochen Unglaube, Kenzingen (DE)

(73) Assignee: Flint Group Germany GmbH (DE)

( * ) Notice: Subject to any disclaimer, the term of this patent is extended or adjusted under 35 U.S.C. 154(b) by 0 days.

(21) Appl. No.: 15/571,099

(22) PCT Filed: May 3, 2016

(86) PCT No.: PCT/EP2016/059844
§ 371 (c)(1),
(2) Date: Nov. 1, 2017

(87) PCT Pub. No.: WO2016/177702
PCT Pub. Date: Nov. 10, 2016

(65) Prior Publication Data
US 2018/0186146 A1    Jul. 5, 2018

(30) Foreign Application Priority Data

May 4, 2015  (EP) ..................................... 15166176

(51) Int. Cl.
| | | |
|---|---|---|
| *B41C 1/05* | (2006.01) | |
| *B41N 1/20* | (2006.01) | |
| *B23K 26/364* | (2014.01) | |
| *B32B 15/09* | (2006.01) | |
| *B32B 27/36* | (2006.01) | |
| *B32B 37/18* | (2006.01) | |
| *B41M 1/10* | (2006.01) | |
| *B41M 1/40* | (2006.01) | |
| *B32B 15/18* | (2006.01) | |
| *B41F 17/00* | (2006.01) | |
| *B41N 1/06* | (2006.01) | |

(52) U.S. Cl.
CPC .............. *B41C 1/05* (2013.01); *B23K 26/364* (2015.10); *B32B 15/09* (2013.01); *B32B 15/18* (2013.01); *B32B 27/36* (2013.01); *B32B 37/182* (2013.01); *B41F 17/001* (2013.01); *B41M 1/10* (2013.01); *B41M 1/40* (2013.01); *B41N 1/06* (2013.01); *B41N 1/20* (2013.01); *B32B 2250/02* (2013.01); *B32B 2255/06* (2013.01); *B32B 2255/10* (2013.01); *B32B 2255/26* (2013.01); *B32B 2311/30* (2013.01); *B32B 2367/00* (2013.01); *B41C 2201/02* (2013.01); *B41C 2201/04* (2013.01); *B41C 2201/14* (2013.01)

(58) Field of Classification Search
None
See application file for complete search history.

(56) References Cited

U.S. PATENT DOCUMENTS

| | | | |
|---|---|---|---|
| 5,355,396 A | 10/1994 | Tai | |
| 5,700,619 A | 12/1997 | Baumann et al. | |
| 6,355,395 B1 * | 3/2002 | Zwez | ...................... G03F 7/033 430/271.1 |
| 6,355,396 B1 | 3/2002 | Nakamura | |
| 2009/0081414 A1 * | 3/2009 | Sugasaki | ................... B41C 1/05 428/172 |

FOREIGN PATENT DOCUMENTS

| | | |
|---|---|---|
| EP | 1172227 A1 | 1/2002 |
| EP | 1177911 A1 | 2/2002 |
| EP | 1701852 A1 | 9/2006 |
| EP | 2047987 A2 | 4/2009 |
| EP | 2767408 A2 | 8/2014 |
| WO | WO-2006061053 A1 | 6/2006 |

OTHER PUBLICATIONS

English Translation of International Preliminary Report for Patentability for International Application No. PCT/EP2016/059844, dated Apr. 12, 2018.
International Preliminary Report on Patentability for PCT/EP2016/059844 dated Apr. 18, 2017 (in German).
International Search Report for PCT/EP2016/059844 dated Jun. 14, 2016.
Written Opinion of the International Searching Authority for PCT/EP2016/059844 dated Jun. 14, 2016.

* cited by examiner

*Primary Examiner* — Joshua D Zimmerman
(74) *Attorney, Agent, or Firm* — Faegre Drinker Biddle & Reath LLP

(57) ABSTRACT

A laser-engravable pad printing plate comprising at least
(a) a metal support,
(b) an adhesion layer,
(c) a laser-engravable recording layer having a layer thickness of 20 μm to 200 μm,
(d) a cover film,
characterized in that the laser-engravable recording layer (c) comprises
(c1) 40 to 95 wt % of a polyvinyl alcohol,
(c2) 5 to 50 wt % of an IR absorber,
(c3) 0 to 30 wt % of an inorganic filler,
(c4) 0 to 20 wt % of a crosslinker, and
(c5) 0 to 10 wt % of further additives.

15 Claims, No Drawings

LASER-ENGRAVABLE PAD PRINTING PLATE

CROSS-REFERENCE TO RELATED APPLICATIONS

This application is a national stage application (under 35 U.S.C. § 371) of PCT/EP2016/059844, filed May 3, 2016, which claims benefit of European Application No. 15166176.6, filed May 4, 2015, both of which are incorporated herein by reference in their entirety.

Pad printing is an indirect gravure process which is used for printing a wide variety of different materials and shapes, including three-dimensional objects. In this printing process, a printing cliché with depressions (wells, letters, line elements) is inked with printing ink. The excess printing ink is removed by doctor blade from the surface of the printing forme. At this point a soft rubber element, known as the pad, is pressed onto the surface of the printing forme, and the printing ink is transferred from the depressions in the printing cliché to the pad. The pad is subsequently lifted up and moved horizontally and then lowered again onto the object that is to be printed. In order to achieve ink transfer that is as complete as possible, it is usual for silicone-based rubber materials to be used.

The doctor blade operation imposes exacting requirements on the mechanical stability of the printing cliché. Any damage to the cliché surface—scratches resulting from dust particles, contaminations of the printing ink, or an uneven doctor blade—results in tinting of the nonimage areas and renders the cliché unusable. For long runs, therefore, steel clichés are used, into which the depressions are engraved by means of photographic mask techniques and etching techniques, at high cost and complexity.

Alternative printing clichés are based on photopolymeric layer materials. These materials comprise a photopolymerizable layer on a stable metal support. The photopolymerizable layer is exposed by means of UVA light through a film. The exposed areas of the recording layer are crosslinked and become insoluble; the unexposed areas of the recording layer remain soluble and are removed in a subsequent washing step. Binders mentioned are polyvinyl alcohol and polyamide. To increase the scratch resistance, mineral fillers are added to the photopolymeric layer. Furthermore, as crosslinkers, descriptions are given of specific bifunctional acrylates, which afford hard, scratch-resistance materials after exposure to UVA light. The process, however, is a costly and inconvenient one, and the photographic films are expensive.

EP 767 408 therefore describes photopolymerizable materials which, on the photopolymeric layer, have a thin, black mask layer into which the image information can be written by means of laser. The photopolymerizable layer is subsequently exposed with UVA light through the mask produced, and is crosslinked. The unexposed areas are again removed in a washing step. In this process there is no longer any need for a film. Nevertheless, the process remains costly and inconvenient, and the depth of the individual wells is difficult to control.

It would be simpler to engrave the depressions into the printing forme directly by means of a laser. For example, single-layer or multilayer metal printing formes are known into which the depressions are engraved directly by means of a laser. In that case, a disruptive burr is formed around the engraved image elements, arising as a result of the melting of the metal. This burr has to be removed, at cost and inconvenience, in order to obtain a satisfactory doctor blade outcome.

Ceramic clichés may likewise be engraved directly using suitable lasers, as described in EP 1 701 852, for example. Ceramic materials have less of a tendency to melt and so do not require afterwork. Nevertheless, producing the ceramic layers in the accuracy of thickness required is expensive and inconvenient.

EP 1 172 227 therefore proposes the application, to a metal support, of a one-component or two-component coating material in a layer thickness of 0.1 to 0.3 mm, and the engraving of the relief into the cured coating material. The chemical composition of the coating material, however, is not described, and so it is unknown how sufficient doctor blade resistance and a satisfactory, burr-free engraving outcome can be achieved with such a setup.

It is an object of the invention to provide a laser-engravable printing plate for pad printing that can be manufactured inexpensively, does not require costly and inconvenient afterwork after laser engraving, and exhibits the required doctor blade resistance.

The object is achieved by means of a laser-engravable pad printing plate comprising at least
(a) a metal support,
(b) an adhesion layer,
(c) a laser-engravable recording layer having a layer thickness of 20 µm to 200 µm,
(d) a cover film,
characterized in that the laser-engravable recording layer (c) comprises
(c1) 40 to 95 wt % of a polyvinyl alcohol,
(c2) 5 to 50 wt % of an IR absorber,
(c3) 0 to 30 wt % of an inorganic filler,
(c4) 0 to 20 wt % of a crosslinker, and
(c5) 0 to 10 wt % of further additives.

The thickness of the laser-engravable recording layer (c) is guided by the required depth of the image elements to be engraved. In pad printing, these elements are generally a few µm up to a maximum of 50 µm deep. For certain specialty applications, where high quantities of ink have to be transferred, image element depths of up to 150 µm are required. Generally speaking, however, relief depths of up to 30 µm are sufficient. The thickness of the laser-engravable recording layer is therefore in a range from 20 to 200 µm, preferably from 20 to 50 µm, more particularly from 20 to <50 µm. The figures are based on the dried recording layer.

The pad printing clichés are printed predominantly using printing inks which are apolar or of moderate polarity, and so relatively polar binders are appropriate for reasons of swelling resistance relative to organic solvents. The binder ought additionally to have good dispersing properties for the reinforcing inorganic fillers, to have good mechanical properties, to be laser-engravable as far as possible without melt edges, and to give the laser-engraved recording layer (printing cliché) very good doctor blade resistance.

Surprisingly it has been found that laser-engravable lasers for pad printing plates with outstanding doctor blade resistance can be obtained using polyvinyl alcohols as binders.

Furthermore, the laser-engravable layers of the invention, based on polyvinyl alcohol, have very good swelling resistance with respect to organic solvents, and so the resulting printing clichés can be printed effectively using apolar or moderately polar printing inks. Moreover, the polyvinyl alcohol has good dispersing properties for reinforcing inorganic fillers and produces recording layers which are laser-engravable without melt edges and exhibit good mechanical properties.

Polyvinyl alcohols are polymers with vinyl alcohol units, more particularly partially or fully hydrolyzed polyvinyl acetates. Vinyl acetate-vinyl alcohol copolymers are characterized by the molecular weight and the degree of hydrolysis (the percentage fraction of the vinyl alcohol units in the polymer, based on the total number of monomer units). The crystallinity of the products and their mechanical properties can be controlled according to the degree of hydrolysis. The polar nature of the OH groups is responsible, furthermore, for the good dispersing capacity of the polyvinyl alcohols. Polyvinyl alcohols are highly suitable from the standpoint of laser engravability as well. They do not exhibit pronounced melting, instead decomposing when exposed to high temperatures—of the kind which arise in the course of laser engraving—without residue. The recording layers formulated with polyvinyl alcohols as binders can be engraved without burring by means of IR lasers.

For the printing plates of the invention, partially hydrolyzed polyvinyl alcohol esters with a moderate to high degree of hydrolysis are preferred. If the degree of hydrolysis is too low, the polymers are too soft and are no longer resistant toward apolar pad printing inks. At very high degrees of hydrolysis, the products become too hard and brittle, with adverse consequences in particular for the doctor blade resistance/scratch resistance of the pad printing clichés. In general, polyvinyl alcohols (c1) used are polyvinyl alcohols having a degree of hydrolysis of 50% to 98%. Preferred for use are polyvinyl alcohols having a degree of hydrolysis of 60% to 90%.

Instead of or together with vinyl acetate-vinyl alcohol copolymers it is also possible for other vinyl alcohol copolymers, such as, for example, polyvinyl propionate-vinyl alcohol), or poly(ethylene-vinyl alcohol), to be used as binders (c1) in the laser-engravable recording layer (c), provided they contain at least 50 mol % of vinyl alcohol units.

Preference is therefore given to a laser-engravable recording layer (c) which as polyvinyl alcohol (c1) comprises a partially hydrolyzed polyvinyl alcohol ester having a degree of hydrolysis of 50 to 98 mol %.

Suitable IR absorbers for the recording layer include, in particular, finely divided carbon black, graphite, or carbon black nanoparticles. Carbon black has a broad absorption spectrum, which extends from the visible range into the IR range. Layers containing carbon black can therefore be engraved with all commercially customary lasers such as, for example, IR laser diodes (830 nm) or Nd:YAG solid-state or fiber lasers (1064 nm) or $CO_2$ lasers (10.6 μm). Of course, the laser-engravable recording layer may also comprise other IR absorbers, based on pigments, or soluble dyes. Dyes which may be used include, for example, phthalocyanines and substituted phthalocyanine derivatives, cyanine and merocyanine dyes, or else polymethine dyes or azo dyes. These dyes absorb in the near IR region, and so can be engraved using laser diodes (830 nm) and Nd:YAG lasers (1064 nm).

The recording layer (c) preferably comprises as IR absorber (c2) carbon black, graphite, or carbon nanoparticles.

Particularly preferred for use as IR absorber is carbon black, since the carbon black acts simultaneously as a mechanical reinforcing agent and increases the mechanical resistance of the laser-engravable recording layer.

The amount of the materials (c2) absorbing IR light is 5 to 50 wt %, relative to the amount of all components of the laser-engravable recording layer. An amount of 10 to 30 wt % is preferred.

A further component of the laser-engravable recording layer comprises mineral fillers, which mechanically reinforce the layer and so endow the layer with the necessary scratch resistance and doctor blade resistance.

Suitable fillers include, in particular, hard, inorganic fillers and pigments. Examples of particularly suitable fillers are silicon dioxide, especially finely ground quartzes and quartz powders, silicates, especially aluminum silicates, silicate glasses, aluminum oxides, especially corundum, titanium dioxide, silicon carbide, tungsten carbide, and similar hard minerals. Examples of suitable pigments are iron oxides or chromium oxides.

The hardness of the fillers ought to be >4.0 on the Mohs hardness scale. The average particle diameter of the inorganic fillers is generally 0.1 μm to 6 μm. Less than 5% of the particles, preferably less than 1% of the particles, ought to be larger than 10 μm. The shape of the fillers is arbitrary. The majority of hard fillers do not form round particles, but instead have arbitrary crystalline forms. The length of the individual crystals (measured under the microscope), however, ought preferably not to be more than 10 μm.

The fillers may be surface-treated or coated, so as to be particularly effectively dispersible in the polymeric matrix. Surface-treated finely ground quartzes are preferred, since they have the necessary hardness and permit effective attachment to the polymeric matrix. Particularly preferred are finely ground quartzes whose surfaces have been pre-treated using silanes (aminosilane, epoxy silane, methacryloylsilane, methylsilane, and vinylsilane) and which can simply be dispersed uniformly into the polyvinyl alcohol solution by means of stirred incorporation.

The mineral filler is present preferably in the recording layer, generally in amounts of 5 to 30 wt %. The amount of IR absorber (c2) and mineral filler (c3) in total is not more than 60 wt %. Preferably it is not more than 50 wt %, based on all components of the laser-engravable recording layer.

Preferably, therefore, the recording layer (c) comprises 5 to 30 wt % of an inorganic filler (c3), more particularly of an inorganic filler (c3) having a hardness of >4 Mohs. In one embodiment of the invention, the recording layer (c) comprises, as inorganic filler (c3), a finely ground quartz whose surface has been modified with silanes.

In a further embodiment of the invention, the recording layer, further to the mechanical reinforcement by the IR absorber (c2), preferably carbon black, and optionally by the inorganic filler (c3), is chemically crosslinked as well. The noncrosslinked recording layers of polyvinyl alcohol, carbon black, and inorganic filler do already have good doctor blade resistance. This resistance, however, can be increased still further by chemical crosslinking of the polyvinyl alcohol. The resistance of the recording layer with respect to high atmospheric humidity is also improved considerably if the polyvinyl alcohol is chemically crosslinked. Noncrosslinked recording layers comprising polyvinyl alcohol must be handled cautiously. In order to avoid fingerprints on the surface of the printing plate, the wearing of gloves is advisable. Recording layers based on crosslinked polyvinyl alcohol, in contrast, are relatively insensitive toward moisture or fingerprints, and so no particular measures are necessary during the handling of the pad printing plates.

For the chemical crosslinking of the recording layer based on polyvinyl alcohols, a variety of crosslinkers are contemplated, such as polyfunctional isocyanates, mono- or polyfunctional aldehydes, polyfunctional epoxides, polyfunctional carboxylic acids, and polyfunctional carboxylic anhydrides.

Suitable polyfunctional isocyanates are toluene 2,4-diisocyanate (TDI), methylenediphenyl diisocyanate (MDI), hexamethylene diisocyanate (HDI, HMDI), polymeric methylenediphenyl diisocyanate (PMDI), isophorone diisocyanate (IPDI), 4,4'-diisocyanatodicyclohexylmethane (H12MDI), and also blocked aromatic polyisocyanates based on TDI and blocked aliphatic polyisocyanates based on HDI, Suitable monofunctional aldehydes are formaldehyde, acetaldehyde, propionaldehyde, valeraldehyde, capronaldehyde, and pivalaldehyde. Suitable polyfunctional aldehydes are glyoxal, glutaraldehyde (1,5-pentanedial), succinaldehyde (butanedial), and terephthalaldehyde.

Suitable polyfunctional epoxides are 1,2,3,4-diepoxybutane, 1,2,5,6-diepoxyhexane, 1,2,7,8-diepoxyoctane, and also epoxy resins such as bisphenol A diglycidyl ether, or epoxyphenol novolaks.

Suitable polyfunctional carboxylic acids are oxalic acid, malonic acid, succinic acid, glutaric acid, adipic acid, pimelinic acid, suberic acid, azelaic acid, sebacic acid, tartaric acid, citric acid, terephthalic acid, phthalic acid, asparatic acid, and glutaminic acid.

Suitable polyfunctional carboxylic anhydrides are maleic anhydride, succinic anhydride, and phthalic anhydride.

Particularly preferred among the crosslinking reactions is the reaction of polyvinyl alcohols with polyfunctional isocyanates, polyfunctional epoxides, or mono- or polyfunctional aldehydes. These crosslinking reactions proceed virtually quantitatively at temperatures which are not too high. Preferred crosslinkers are aldehydes such as formaldehyde, acetaldehyde, propionaldehyde, butyraldehyde, and higher aldehydes. In addition to their high reactivity, a further advantage of these crosslinkers is that they consist only of carbon, oxygen, and hydrogen. Accordingly, in conjunction with polyvinyl alcohols, recording layers are produced which on laser engraving release considerably fewer toxic gases than recording layers which comprise nitrogen-containing components, such as isocyanates, for example.

Particular preference is given to crosslinking with polyfunctional aldehydes such as, for example, glyoxal, glutaraldehyde or glyoxylic acid. Especially preferred is glyoxal. This aldehyde is already in the form of an aqueous solution and can therefore be admixed readily to aqueous or alcoholic polyvinyl alcohol solutions. The solutions are sufficiently stable at room temperature and can therefore be applied in layers effectively. After the coating, the layers are briefly heated to temperatures of 100° C. to 150° C. Under these conditions, the glyoxal reacts with the OH groups of the polyvinyl alcohol via the hemiacetals to form the more stable acetals. Polyvinyl alcohol is subsequently crosslinked. The recording layer can no longer be finely dispersed or dissolved by water or a water/alcohol mixture.

There is a further advantage to the crosslinking of the recording layer. It may be necessary to achieve the desired dry film thickness by building up the layer in a plurality of individual coating operations. Where a noncrosslinked layer is coated over with an identical coating solution, this layer is partially dissolved. There are leveling defects which are detrimental to the coating quality. A crosslinked layer, in contrast, can be readily coated over. By building up the layer in a plurality of coating operations, therefore, it is possible to achieve very much higher layer thicknesses.

The crosslinker is present in the recording layer in general in amounts of 0.1 to 20 wt %, based on the amount of all components of the laser-engravable recording layer. The fraction of crosslinker is preferably from 1 to 10 wt %.

Preferably, therefore, further to components (c1), (c2), and optionally (c3), the laser-engravable recording layer (c) additionally contains 0.1 to 20 wt % of a crosslinker (c4). Preferred crosslinkers are glyoxal or glutaraldehyde.

Besides components (c1), (c2), optionally (c3), and optionally (c4), the recording layer may comprise other components such as plasticizers, flow control assistants, and dispersing assistants as further additives (c5). Additives are generally present in the recording layer in amounts of 0 to 10 wt %, preferably 0.1 to 5.0 wt %, based on the sum total of all components (c1) to (c5). The sum total of the components (c1) to (c5) makes 100 wt %.

The laser-engravable recording layer is located on a metallic support material. Aluminum or steel is preferred as metallic support. Steel has the advantage that in that case the pad printing cliché can be fixed magnetically in the pad printing machine. The thickness of the metallic support may be 0.05 mm to 1 mm. If steel is used as support material, preference is given to steel plates having a thickness of 0.05 to 0.3 mm. Tin-plated steel plates are used with preference for protection against corrosion.

For the effective attachment of the laser-engravable recording layer to the metallic support (a), at least one adhesion layer (b) is applied to said support. Examples of highly suitable adhesion layers are 2-component polyurethane adhesion varnishes comprising a polyol and a polyfunctional isocyanate. Alternatively, it is possible to use epoxide varnishes or radically curing adhesion varnishes. For more effective attachment of the recording layer to the metal support, the adhesion varnishes may comprise pigments or further additives. The thickness of the adhesion varnish layer or of the various adhesion layers is generally a few micrometers, preferably 1 µm to 20 µm.

To protect the printing plate surface, the pad printing plates of the invention have a cover film which is not removed until before the processing of the pad printing plate to the printing cliché. Highly suitable are PET cover films which are 50 µm to 200 µm thick and have an average roughness. PET films having an averaged roughness depth of between 0.3 µm and 3 µm are preferred for use as cover films.

The individual layers of the pad printing plate of the invention can be applied in any desired way, by spraying, rolling or doctor blade processes.

In one preferred embodiment, the metallic support is first of all coated with the adhesion varnish or varnishes. In parallel with this, the laser-engravable recording layer is applied to the PET cover film. This is done by dissolving the polyvinyl alcohol in water or water/alcohol mixtures, after which carbon black is added. The suspension is then dispersed for a number of hours in a ball mill, producing fine dispersal of the carbon black. The remaining components of the recording layer are subsequently added. The solution is then coated onto the PET film in one or more steps, and thereafter dried.

In the course of drying, the recording layer is heated briefly to temperatures between 100 and 150° C., and the polyvinyl alcohol is consumed by reaction with the crosslinker—if present in the recording layer. The necessary drying times and/or reaction times are in the region of a few seconds. The coated cover film is subsequently laminated onto the metallic support. This laminating process may be carried out dry, under the action of heat, or with the aid of a laminating solvent.

If the recording layer is produced not in a single coating operation, but instead in a plurality of consecutive partial coating operations, it is advantageous if the recording layer comprises a crosslinker. In that case the layer applied first undergoes crosslinking on drying and can subsequently be readily coated over with an identical coating solution. A noncrosslinked layer, in contrast, cannot be coated over. As observed, there are leveling defects, and the quality of coating is adversely affected.

If the recording layer is first coated onto a cover film and only then laminated onto the metallic support, better printing outcomes are obtained, surprisingly, than if the individual layers are applied successively to the metallic support and lined at the end with a cover film. Presumably, when the recording layer is poured on, the surface geometry of the PET film is imaged onto this layer, and a more uniform surface is produced, thereby enhancing the sliding behavior of the doctor blade in the pad printing machine.

Preference is therefore given to a method for producing a pad printing plate of the invention, comprising the steps of
(i) coating the metal support with the adhesion layer,
(ii) applying the laser-engravable recording layer to the PET cover film and drying the recording layer,
(iii) laminating the coated PET cover film onto the metal support coated with the adhesion layer.

Another subject of the present invention is a method for producing a pad printing cliché from a laser-engravable pad printing plate of the invention, comprising steps (iv) to (vi):
(iv) removing the cover film from the pad printing plate,
(v) engraving the depressions into the laser-engravable recording layer by means of an IR laser,
(vi) cleaning the laser-engraved pad printing cliché by rinsing with a solvent.

After the removal of the cover film, the depressions are engraved with the aid of a laser into the recording layer of the pad printing plate. If carbon black is used as IR absorber, the pad printing plates of the invention can be engraved with all commercially customary lasers, such as, for example, IR laser diodes (830 nm) or Nd:YAG solid-state or fiber lasers (1064 nm), or $CO_2$ lasers (10.6 µm). With regard to fineness of the laser engraving, or maximum resolution of engraving, the basic rule is that Nd:YAG lasers, or laser diodes which operate in the near IR, respectively, are superior to the $CO_2$ lasers.

In the case of very fine lines or image elements, they are written into the recording layer without further processing of the data. In the case of high-quality applications, or when relatively large image elements are to be printed, it is usual to provide additional screening of the image elements, in order to give the doctor blade a resting surface and to prevent sinking of the blade into the image elements. In order to enable this, the image elements are provided with a dot or line screen. The resolution of the screen is customarily in the order of magnitude of 60 to 120 L/cm. About 10% to 30% of the surface remains raised and forms individual screen dots or line/lattice structures, on which the doctor blade is able to slide. The diameter of the raised screen dots, depending on resolution and selected surface coverage, is in that case about 20 µm to 100 µm. Depending on the selected resolution and surface coverage, the raised dots may also be square or have more complex angular forms. For printing, the ink which is located in the depressions between the raised elements is subsequently transferred to the pad. It is self-evident that on printing, the raised, fine screen and line elements are subject to massive mechanical loading. If the doctor blade resistance is inadequate, individual screen dots will be abraded or fall away entirely, or scratches or breakouts will be apparent at the line elements.

The depths of engraving are generally between 20 and 30 µm. For the laser engraving of the pad printing plates of the invention, an energy input of 10 $J/cm^2$ up to 20 $J/cm^2$ is generally required. At higher energies, the resolution of the fine elements is adversely affected. The fine elements will no longer be imaged with accurate detail. They will be damaged, or suffer partial melting, or burn. If energies are too low, engraving will not be sufficiently deep.

The lasers may engrave the pad printing plate flatly or, stretched onto a drum, circularly. The engraving may also take place directly in the pad printing machine. After having been engraved, the pad printing clichés are usually cleaned by rinsing with a cleaning fluid to remove laser dust and other contaminants. For the pad printing plates of the invention, cleaners based on hydrocarbon solvents, esters or ketones are readily suitable. Water and alcohols, conversely, are less suitable, owing to the swelling of the pad printing clichés.

The doctor blade resistance of the pad printing clichés of the invention is dependent not only on the composition of the recording layer but also on the surface quality and the roughness of the surface. Typical roughness values, measured as averaged roughness depth Rz according to DIN 4768, ought to be greater than 0.3 µm and less than 3 µm. At higher roughness values, the plate may tone, i.e., transfer printing ink to the nonimaged areas. In the case of entirely smooth layers, surprisingly, the doctor blade resistance is lower.

The engraved pad printing clichés are subsequently mounted in the pad printing machine. The clichés are usually fixed magnetically, something which of course necessitates a magnetic steel support. A distinction is made between machines with closed and open ink blade pots. For high-quality prints, machines with a closed blade pot are preferred. In that case, however, the mechanical load on the clichés is greater than in the open system.

For printing, solvent-based one-component inks or two-component inks are employed. It is usual to use printing inks based on polyester resins. Typical solvents are aromatic or aliphatic hydrocarbon solvents, cyclohexanone, and acetates. Curing agents used are usually polyfunctional aliphatic isocyanates. For final through-curing, these inks often require several days. More recently, UV-curing printing inks have also increasingly been used.

A further subject of the present invention, therefore, is a method for printing a substrate by the pad printing process with a pad printing cliché of the invention, obtainable by the method described above, comprising steps (vii) to (x):
(vii) fastening the pad printing cliché in the pad printing machine,
(viii) inking the pad printing cliché with a solvent-based pad printing ink,
(ix) stripping off the excess printing ink by means of a doctor blade,
(x) transferring the printing ink by means of a rubber pad onto the substrate to be printed.

The invention is elucidated in more detail by the examples below.

EXAMPLES

Production of Pad Printing Plates

Example 1

A tin-plated steel plate 240 µm thick was coated with a 2-component polyurethane adhesion varnish (2K PU topcoat GM60-6203 from BASF and Desmodur L67MPA/X from Bayer as curing agent in a ratio of 2:1) in a curtain coater. Following application of the adhesion varnish, the plate was baked at 250° C. for 1 minute. The average coat weight of the adhesion varnish was 15 µm.

In parallel to this, a PET film of medium roughness (Melinex 383, layer thickness 125 mm, available from Dupont-Teijin) was coated with a laser-engravable recording layer. The composition of the recording layer is reproduced in the table below.

| Component | Function | Manufacturer | Fraction solids (wt %) |
|---|---|---|---|
| Alcotex 72.5 | binder | Kuraray | 63.00 |
| Carbon black (Pigment Black 7) | IR absorber | Lanxess | 27.75 |
| Syloid ED3 | filler | Degussa | 8.99 |
| Capstone FS-30 | flow control assistant | Dupont | 0.26 |
| Total | | | 100 |

The components of the recording layer were dissolved in water/n-propanol in a ratio of 3:1 (solids content 16.3 wt %) and dispersed in a ball mill for 3 h. The solution was applied by the metering roller application process on a coating line with double applicator system. In the first applicator system, a dry film thickness of 10 µm was applied; in the second applicator system, a dry film thickness of 20 µm. The web speed was 10 m/min and the length of the drying tunnel was about 12 m, hence resulting in a drying time of 72 seconds. Drying was accomplished by heated circulating air in a countercurrent process. The maximum temperature of the circulating air in the drier was 145° C. The PET film coated with the recording layer was subsequently laminated onto the coated steel plate. n-Propanol was used as a laminating assistant. The pad printing plates were thereafter stored at room temperature for 2 days and then processed further.

Example 2

Procedure as per example 1, but without inorganic filler in the recording layer.

Example 3

Procedure as per example 1, but the recording layer was additionally crosslinked with glyoxal.

The composition of the recording layer as per example 3 is reproduced in the table below.

| Component | Function | Manufacturer | Fraction solids (wt %) |
|---|---|---|---|
| Alcotex 72.5 | binder | Kuraray | 61.35 |
| Carbon black (Pigment Black 7) | IR absorber | Lanxess | 27.02 |
| Syloid ED3 | filler | Degussa | 8.75 |
| Glyoxal | crosslinker | BASF | 2.62 |
| Capstone FS-30 | flow control assistant | Dupont | 0.26 |
| Total | | | 100 |

Example 4

Procedure as per example 3, but Silbond 800 EST from Quarzwerke Group was used as inorganic filler.

Laser Engraving and Printing Tests

The cover film of the pad printing plates from examples 1 to 4 was removed.

The plates were mounted onto the drum of an IR laser (Thermoflex X 48, Xeikon) and lasered with a resolution of 5080 dpi. The lasered motif comprised three different screen wedges, the resolution of the screen selected being 80 L/cm, 100 L/cm, and 120 L/cm. For each ruling, the surface coverage was varied from 70% to 90%. Surface coverage in pad printing means the percentage area removed by engraving, in comparison to the total area.

The power of the laser was 30 watts. The optimum distinctness of imaging was achieved at a speed of rotation of 3.5 revolutions per second. This speed of rotation corresponds to an energy input of 15 J/cm$^2$.

The engraved clichés were subsequently mounted on a pad printing machine (from Morlock, closed blade pot). The pad printing ink used was a solvent-based pad printing ink, Marabu TPY980 (white). The ink contains hydrocarbons, ketones, and acetates as solvents. The curing agent added was 10% isocyanate curing agent H1 from Marabu. The clichés were processed with a frequency in each case of 1000 doctor blade operations per hour, and were subjected after 1 hour in each case to microscopic examination for damage/erosion, etc. As soon as initial damage, such as the absence of individual screen elements, was detectable, the test was terminated and the number of doctor blade operations was recorded.

The results of the printing tests are reproduced in the table below.

| Example | 1 | 2 (comparative) | 3 | 4 |
|---|---|---|---|---|
| Removal of the cover film | easy | easy | easy | easy |
| Adhesion of the recording layer | not removable | not removable | not removable | not removable |
| Water solubility of the recording layer | soluble | soluble | insoluble | insoluble |
| Laser energy (J/cm$^2$) | 14.0 | 14.0 | 14.0 | 14.0 |
| Depth of engraving (µm) | 28 | 30 | 31 | 30 |
| Dimensions of raised elements at 120 L/cm and 90% surface covered | 15 × 15 µm | 15 × 15 µm | 15 × 15 µm | 15 × 15 µm |
| Doctor blade resistance | 4000 | 1000 | >40000 | >40000 |
| Handling | difficult | difficult | easy | easy |

The cover film was readily removable from all the clichés. The adhesion to the varnished steel support was high. The recording layer could no longer be removed from the support. After coating and drying, the recording layer remained water-soluble in the tests without crosslinker, meaning that the layer could be dissolved with fine dispersion. The crosslinked layers, in contrast, were insoluble in water. There were no problems with the handling of the crosslinked recording layers. When the noncrosslinked plate surfaces from examples 1 and 2 were touched, in contrast, they exhibited significant fingerprints.

The printing plates were engraved with a laser energy of 14 J/cm². The depth of engraving of around 30 µm was achieved in the case of all the clichés. In all of the clichés, fine elements could be imaged up to a surface coverage of 90%. The raised, fine elements were approximately square with an edge length of 15 µm. No melt burr could be seen on any cliché.

A notable feature was the unexpectedly good doctor blade resistance of the printing plate from example 1 without chemical crosslinker, which withstood up to 4000 doctor blade operations without damage. In contrast, the doctor blade resistance of the printing plate according to example 2 (without inorganic filler) was significantly poorer. The printing plates of examples 3 and 4, in which the recording layer was additionally crosslinked chemically, had excellent doctor blade resistances. After 40 000 doctor blade operations, these clichés were still undamaged.

The invention claimed is:

1. A laser-engravable pad printing plate comprising:
   (a) a metal support,
   (b) an adhesion layer,
   (c) a laser-engravable recording layer having a layer thickness of 20 µm to 200 µm obtained from a mixture comprising
       (c1) 40 to 95 wt % of a polyvinyl alcohol,
       (c2) 5 to 50 wt % of an IR absorber,
       (c3) 0 to 30 wt % of an inorganic filler,
       (c4) 0.1 to 20 wt % of a crosslinker, and
       (c5) 0 to 10 wt % of further additives,
   (d) a cover film,
   wherein the crosslinker (c4) is selected from the group consisting of polyfunctional isocyanates, mono- or polyfunctional aldehydes, polyfunctional epoxides, polyfunctional carboxylic acids and polyfunctional carboxylic anhydrides; and
   wherein the laser-engravable recording layer is obtained in a process comprising chemically crosslinking the crosslinker with the polyvinyl alcohol.

2. The laser-engravable pad printing plate as claimed in claim 1, wherein the laser-engravable recording layer (c) comprises as polyvinyl alcohol (c1) a partially hydrolyzed polyvinyl alcohol ester having a degree of hydrolysis of 50 to 98 mol %.

3. The laser-engravable pad printing plate as claimed in claim 1, wherein the recording layer (c) comprises as IR absorber (c2) carbon black, graphite or carbon nanoparticles.

4. The laser-engravable pad printing plate as claimed in claim 1, wherein the recording layer (c) comprises 5 to 30 wt % of an inorganic filler.

5. The laser-engravable pad printing plate as claimed in claim 1, wherein the recording layer (c) comprises an inorganic filler (c3) having a hardness of >4 Mohs.

6. The laser-engravable pad printing plate as claimed in claim 1, wherein the recording layer (c) comprises as inorganic filler (c3) a finely ground quartz whose surface has been modified with silanes.

7. The laser-engravable pad printing plate as claimed in claim 1, wherein the sum total of IR absorber (c2) and inorganic filler (c3) in the recording layer is <50 wt %.

8. The laser-engravable pad printing plate as claimed in claim 7, wherein the crosslinker is glyoxal or glutaraldehyde.

9. The laser-engravable pad printing plate as claimed in claim 1, wherein the adhesion layer is a 2-component polyurethane adhesion varnish.

10. The laser-engravable pad printing plate as claimed in claim 1, wherein the metal support (a) is a steel plate having a thickness of 50 to 300 µm.

11. The laser-engravable pad printing plate as claimed in claim 1, wherein the cover film is a PET film having a mean roughness depth Rz of 0.3 to 3 µm.

12. A method for producing a pad printing plate comprising:
   (a) a metal support,
   (b) an adhesion layer,
   (c) a laser-engravable recording layer having a layer thickness of 20 µm to 200 µm,
   (d) a PET cover film,
   wherein the laser-engravable recording layer (c) is made from a mixture which comprises
       (c1) 40 to 95 wt % of a polyvinyl alcohol,
       (c2) 5 to 50 wt % of an IR absorber,
       (c3) 0 to 30 wt % of an inorganic filler,
       (c4) 0.1 to 20 wt % of a crosslinker, and
       (c5) 0 to 10 wt % of further additives,
       wherein the laser-engravable recording layer is obtained by a process comprising chemically crosslinking the crosslinker with the polyvinyl alcohol;
   the method comprising steps (i) to (iii):
   (i) coating the metal support with the adhesion layer,
   (ii) applying the laser-engravable recording layer to the PET cover film and drying the recording layer in one or more steps,
   (iii) laminating the coated PET cover film onto the metal support coated with the adhesion layer;
       wherein the crosslinker (c4) is selected from the group consisting of polyfunctional isocyanates, mono- or polyfunctional aldehydes, polyfunctional epoxides, polyfunctional carboxylic acids and polyfunctional carboxylic anhydrides.

13. A method for producing a pad printing cliché from a laser-engravable pad printing plate as defined in claim 12, further comprising steps (iv) to (vi):
   (iv) removing the PET cover film from the pad printing plate,
   (v) engraving the depressions into the laser-engravable recording layer by means of an IR laser,
   (vi) cleaning the laser-engraved pad printing cliché by rinsing with a solvent.

14. A method for printing a substrate by the pad printing process with a pad printing cliché obtainable by the method of claim 13, further comprising steps (vii) to (x):
   (vii) fastening the pad printing cliché in the pad printing machine,
   (viii) inking the pad printing cliché with a solvent-based pad printing ink,
   (ix) stripping off the excess printing ink by means of a doctor blade,
   (x) transferring the printing ink by means of a rubber pad onto the substrate to be printed.

15. A laser-engravable pad printing plate comprising:
   (e) a metal support,
   (f) an adhesion layer,
   (g) a laser-engravable recording layer having a layer thickness of 20 µm to 200 µm obtained from a mixture comprising
       (c6) 40 to 95 wt % of a polyvinyl alcohol,
       (c7) 5 to 50 wt % of an IR absorber,
       (c8) 0 to 30 wt % of an inorganic filler, (c9) 0.1 to 20 wt % of a crosslinker, and
(c10) 0 to 10 wt % of further additives,
(h) a cover film,
wherein the crosslinker (c4) is selected from the group consisting of mono- or polyfunctional aldehydes, polyfunctional epoxides, and polyfunctional carboxylic anhydrides; wherein the laser-engravable recording layer is obtained by a process comprising chemically crosslinking the crosslinker with the polyvinyl alcohol.

* * * * *